H. E. SPEYER.
SAW HANDLE.
APPLICATION FILED AUG. 12, 1908.
946,163.
Patented Jan. 11, 1910.
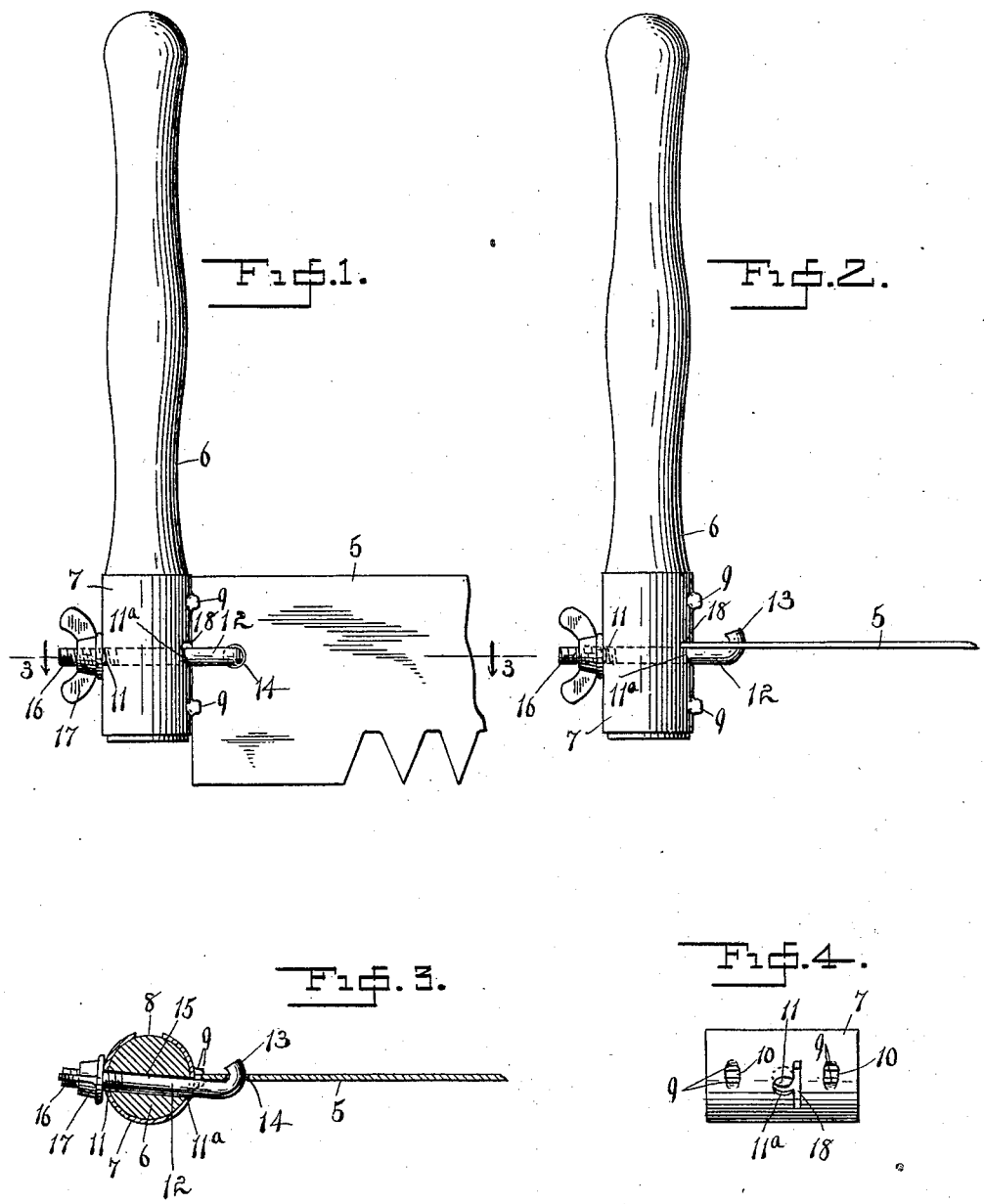

UNITED STATES PATENT OFFICE.

HERBERT E. SPEYER, OF ALGOOD, TENNESSEE, ASSIGNOR TO KEITH, THOMAS & COMPANY, OF ALGOOD, TENNESSEE, A FIRM.

SAW-HANDLE.

946,163.  Specification of Letters Patent.  Patented Jan. 11, 1910.

Application filed August 12, 1908. Serial No. 448,096.

*To all whom it may concern:*

Be it known that I, HERBERT E. SPEYER, citizen of the United States, residing at Algood, in the county of Putnam and State of Tennessee, have invented certain new and useful Improvements in Saw-Handles, of which the following is a specification.

My invention relates to saw handles and means for attaching them to the blade, the particular type of saw to which the invention is especially applicable being that known as cross cut saws used for cutting heavy timbers.

The chief objects of the improvements which form the subject matter of this application are:—to provide a handle for saws of the character stated that can be quickly and easily applied to the saw blade and as readily removed; to supply a removable handle that will clamp the blade securely and be rigid thereon; and to furnish a handle that can be reversed, the means of attachment permitting the handle to be applied so that its axis lies in the plane of the blade or at a right angle thereto, as may be desired.

I accomplish the above and other results of minor importance by the employment of the device illustrated in the accompanying drawing, forming a part of this application, and in which the various details of construction are disclosed in the following views:

Figure 1 is a side elevation of a saw handle attached to the blade of a cross cut saw, a fragment only of the blade being shown, the axis of the handle lying in the plane of the blade; Fig. 2 is a view showing the handle attached at a right angle to the saw blades; Fig. 3 is a sectional view on the line 3—3 of Fig. 1, and Fig. 4 is a side view of the ferrule.

Referring to the details of the drawing, the numeral 5 indicates a cross cut saw-blade, only the extreme end being shown, 6 a handle of the usual pattern and preferably made of wood, and 7 a metal ferrule embracing the attached end of the handle. This ferrule is split along one side as indicated at 8, and is furnished with lugs 9, arranged in pairs, the lugs of each pair being spaced apart so as to leave an interval 10 in which is received the end margin of the saw blade when the handle lies in the plane of the saw as shown in Fig. 1.

The ferrule is made of sheet metal of suitable gage, and I prefer to form the said lugs by striking or punching them up from the metal plate during the process of manufacture. The ferrule is also provided with holes 11, 11ª, for the passage of a hook-bolt clamp 12 furnished at one end with a suitable hook 13, which passes through a hole 14 formed in the saw blade adjacent the handle and engages the margin of the hole as shown. The body of the said bolt passes through said holes formed in opposite sides of the said ferrule, a hole 15 being bored through the handle to admit the bolt. The protruding end of the bolt is furnished with threads 16 to receive a thumb nut 17. The hole 11 is located diametrically opposite the edge of the saw blade as it lies between the lugs 9, as shown in the cross section, Fig. 3. The other hole 11ª in the ferrule, however, is placed a little to one side of the median line so that the hook end of the bolt will pass alongside the blade, but in close apposition therewith. This relative position of the bolt and blade will cause the former to exert its traction at a slight angle to the plane of the saw and thus tend to make the saw hug the bolt with a force proportioned to the tension and thus produce a grip that will prevent any loosening of the handle under ordinary conditions of use.

Upon one side of the ferrule, intermediate of the pairs of lugs 9, is formed a transverse groove 18, of suitable width to receive a saw blade, of determined thickness and said groove is arranged close to the hole 11ª.

It is intended that the handle should be fully equipped with the ferrule and bolt so that it will leave the factory complete and ready for instant attachment to the saw in the following manner:—The thumb nut 17 is retracted so as to permit the hook end to advance sufficiently to permit the hook 13 to engage the hole 14, the end of the blade having been previously entered between the lugs. The said nut 17 is then tightened, drawing the end of the saw firmly into the notches 10, and when the nut is screwed tight against the ferrule the handle will be held rigidly on the saw and will maintain its position until released by relaxing the nut. To reverse the handle so that it will be at a right angle with the plane of the blade the nut 17 is loosened sufficiently to release the end from the engagement of the lugs and the blade and bolt then swung through an angle of 90 degrees until the end of the blade falls into the transverse groove 18 when the nut is tightened as before, holding the handle in the position shown in Fig. 4. A marked advantage is derived from this arrangement, whereby the attachment to the saw is from one side of the blade only, since the handle can be more quickly adjusted or removed.

Having thus described my invention, what I claim is:—

A split tubular sheet metal saw-handle ferrule having holes therethrough and spaced lugs struck up therefrom in the plane of and on opposite sides of one of said holes, and having a centrally arranged transverse slot in one side, and means passing said holes, and adapted to engage a saw blade and hold it in said slot or between said lugs.

In testimony whereof I affix my signature in the presence of two witnesses.

HERBERT E. SPEYER.

Witnesses:
S. J. WILLIAMSON,
S. T. PATTON.